Patented Oct. 8, 1935

2,016,721

UNITED STATES PATENT OFFICE 2,016,721

PROCESS OF OBTAINING ASPHALT AND ASPHALTLIKE SUBSTANCES FROM ACID RESINS AND ACID TAR

Paul William Kunze, Dresden, Germany

No Drawing. Application April 27, 1934, Serial No. 722,807. In Germany May 4, 1933

4 Claims. (Cl. 260—2)

This invention relates to a process of obtaining asphalt and asphaltlike substances from acid resins, acid tar such as are produced during the refining of mineral oils and the processing of fatty oils (e. g. in the manufacture of Twitchell's reagent) and wool grease especially with fuming sulfuric acid (oleum).

It has been proposed to mix the sludge produced by refining mineral oils with sulfuric acid of 60° Baumé with impure or diluted sulfuric acid or with water, and to heat the mixture under pressure or subject it to distillation. When the diluted sludge is heated under pressure, hydrolytic cleavage or cracking is effected whereby decomposition products of the hydrocarbons are produced, but no asphaltlike substances. Elimination of the sulfuric acid from acid tar diluted with water by distillation cannot be carried out, owing to excessive foaming.

Compared with existing processes, the invention provides that the acid resins or the acid tar obtained for instance by refining mineral oils especially by means of fuming sulfuric acid are first heated to approximately 160°-180° C. while being vigorously stirred and without the addition of diluted sulfuric acid or water, i. e., undiluted. The agitator is then stopped, and the acid tar or resin, without further supply of heat, are exposed for about two hours to a pressure of 10 to 25 atmospheres above atmospheric pressure, whereby the sulfuric acid thoroughly mixed with the acid resin or tar will be caused to separate from the hydrocarbons and settle on the bottom. The period of separation can be reduced by increasing the pressure. If atmospheric pressure were now quickly reestablished without cooling, considerable formation of foam and re-mixing of the hydrocarbons and the sulfuric acid would take place. To prevent this effect it is necessary to restore atmospheric pressure gradually and while cooling the mass to about 70° C. The asphalt and the asphaltlike substances will then float as a viscous mass on the sulfuric acid and can be easily separated therefrom.

The sulfuric acid can be used again for refining mineral oils and the like.

The asphaltlike substances will still contain slight amounts of sulfuric acid which, together with the oils and fats present, can be driven off by the passage therethrough of superheated dry steam. For this purpose, the contents of the vessel are heated to about 180° C., whereupon highly superheated and perfectly dry steam is blown in through a coil located at the bottom of the vessel and provided with nozzles. During blowing in the heating of the mass is increased from 150° C. to about 250° C. At 170° C. sulfuric acid and sulfurous acid begin to distil with the steam, and from 180° C. up oils, too, will pass over. At 215° C. the entire sulfuric acid and all oil will be removed. The mass falls back and discloses a clear surface.

By resinification lasting for a shorter or longer time the drop point of the asphalt mass may be adjusted according to Krämer-Sarnow within limits ranging from about 35° C. to 200° C.

As used herein the term "acid sludge" has reference to the sludge or residue resulting from the refining of a mineral oil, fatty oil or wool fat with fuming sulphuric acid.

I claim:—

1. Process of obtaining an asphaltlike substance from acid resins and acid tar, consisting in heating acid resins and acid tar derived from the refinement of mineral oils, the processing of fatty oils and wool grease especially with fuming sulphonic acid in undiluted condition to approximately 160°-180° C., subjecting them without further supply of heat for about 2 hours to a pressure of 10 to 25 atmospheres above atmospheric pressure, gradually restoring atmospheric pressure while cooling the mass to about 70° C., and separating the asphalt and the asphaltlike substances from the separated sulfuric acid.

2. Process according to claim 1, consisting in driving off the slight amounts of sulfuric acid retained in the asphalt and asphaltlike substances, together with the oils and fats present, by passing superheated dry steam through the mass heated to 150° C.–250° C.

3. The process of producing asphalt substances which comprises heating an acid sludge with undiluted fuming sulphuric acid at a temperature between about 160° C. to about 180° C. then subjecting the reaction product, for about two hours, to a pressure of from about 10 atmospheres to about 25 atmospheres without supplying additional heat to the reaction mixture, and gradually restoring atmospheric pressure while cooling the mass to about 70° C.

4. The process of producing asphalt substances as set forth in claim 3, including the step of removing sulphuric acid from the asphalt substances by passing dry superheated steam through the said asphalt heated to a temperature of from about 150° C. to about 250° C.

PAUL WILLIAM KUNZE.